(12) United States Patent
Goelff et al.

(10) Patent No.: US 6,838,180 B1
(45) Date of Patent: Jan. 4, 2005

(54) TRANSPARENT FIRE BREAK GLAZING

(75) Inventors: Pierre Goelff, Nalinnes (BE); Guy Mertens, Vedrin (BE); Xavier Dallenogare, Sauvagemont (BE); Mehdi Ghodsi, Brussels (BE)

(73) Assignee: Glaverbel, Brussels (BE)

( * ) Notice: Subject to any disclaimer, the term of this patent is extended or adjusted under 35 U.S.C. 154(b) by 77 days.

(21) Appl. No.: 10/088,295

(22) PCT Filed: Sep. 11, 2000

(86) PCT No.: PCT/EP00/08948

§ 371 (c)(1),
(2), (4) Date: May 24, 2002

(87) PCT Pub. No.: WO01/19608

PCT Pub. Date: Mar. 22, 2001

(30) Foreign Application Priority Data

Sep. 16, 1999 (BE) .............................................. 9900619

(51) Int. Cl.$^7$ ........................... B32B 17/06; B27N 9/00; B05D 5/06
(52) U.S. Cl. ....................... 428/432; 428/438; 428/689; 428/913; 428/921; 427/162; 427/165
(58) Field of Search ................................ 428/920, 332, 428/432, 336, 437, 438, 913, 921, 688; 427/162, 165

(56) References Cited

U.S. PATENT DOCUMENTS

| 3,917,546 | A | * | 11/1975 | Vogl | 264/162 |
|---|---|---|---|---|---|
| 4,173,668 | A | * | 11/1979 | Hentzelt et al. | 428/34 |
| 4,190,698 | A | * | 2/1980 | De Boel et al. | 428/334 |
| 4,246,169 | A | * | 1/1981 | Norris et al. | 524/127 |
| 4,503,004 | A | * | 3/1985 | Mirabella | 102/334 |
| 4,681,810 | A | * | 7/1987 | Gomez | 428/429 |
| 4,913,847 | A | * | 4/1990 | Tunker | 252/606 |
| 4,992,481 | A | * | 2/1991 | von Bonin et al. | 521/54 |
| 5,055,208 | A | * | 10/1991 | Stewart et al. | 252/8 |
| 6,379,825 | B1 | * | 4/2002 | Goelff et al. | 428/920 |

FOREIGN PATENT DOCUMENTS

| EP | 0 056 267 | * | 7/1982 | .......... C09K/21/04 |
|---|---|---|---|---|
| WO | WO 99/19422 | * | 4/1999 | .......... C09K/21/04 |

OTHER PUBLICATIONS

Degussa, "*Aerosil & Silanes*", Sep. 2001, pp: 1–31.
Degussa, "AEROSIL," *Silice pyrogénée*.

* cited by examiner

Primary Examiner—Stephen Stein
Assistant Examiner—G. Blackwell-Rudasill
(74) *Attorney, Agent, or Firm*—Piper Rudnick LLP; Jerold I. Schneider

(57) ABSTRACT

The invention concerns transparent fire break glass panels. The inventive glazing comprises at least two glass sheets and an intumescent phosphate-based material layer, layer which is located between said two glass sheets. The intumescent material comprises pyrogenous silica or a mixture of pyrogenous silica and alumina which enables said material to be exempt from creep deformation at temperatures preceding the expansion of the intumescent material in fire resistance tests. The inventive glass panels have proved heat resistance, and are more easily manufactured than similar glass panels in prior art.

27 Claims, No Drawings

TRANSPARENT FIRE BREAK GLAZING

CROSS-REFERENCE TO RELATED APPLICATIONS

This application claims priority from PCT Application No. PCT/EP00/08948 filed 11 Sep. 2000, which is based upon and claims priority from Belgium Application No. 9900619 filed 16 Sep. 1999, both of which are hereby incorporated by reference.

BACKGROUND OF THE INVENTION

The invention relates to fire break glazing units comprising an intumescent material with improved properties.

Fire break glazing of this type can lead to the use of different materials. The choice of intumescent materials has a significant influence not only on the thermal characteristics of the glazing but also on the production techniques of such glazing which in particular are one of the significant factors in their cost price.

The products demanded by users must have ever more effective properties. In particular, glazing units must be fire resistant for an increasingly long period in increasingly more severe temperature conditions. To meet these new demands, the manufacturers of such glazing units have proposed in particular the use of new intumescent materials with better resistance to very high temperatures. When evaluating the resistance of these materials, an important factor is the temperature at which the intumescent material melts or breaks down after formation of the foam in fire test cycles. This transformation in the material is associated with the loss of its is insulating properties. If the most usual intumescent materials, those based on hydrated alkaline silicates, transform at a temperature in the order of 400 to 500° C., other materials enable 700° C. to be reached and exceeded.

Of the materials, which lead to foams resistant to the most elevated temperatures, compositions containing phosphates are those which appear to respond best to these new demands. Materials of this type have been the subject of patent publications, in particular WO 99/19422 in the name of the Applicant. Apart from their increased thermal resistance, intumescent materials of this type differ from the most usually used silicate-based materials by their rheological properties and their conditions of use resulting from these. In particular, these phosphate-based compositions gel in very specific conditions, and do not always exhibit the required stability in thermal shock tests. The main difficulty is the tendency of phosphate-based intumescent materials to creep under the effect of the heat at temperatures lower than those at which the foam forms.

It is understood that the efficiency of fire break glazing requires that each of the constituents properly plays its role. Intumescent material contributes in various ways. It absorbs part of the heat received by the glazing by vaporizing the hydrating water it contains. It also forms a screen for thermal conduction and radiation via the opaque foam it forms during evaporation of this same water. Finally, the material holds the glass sheets in position even after they have been shattered by the thermal shock. If the material is removed by creep before causing the formation of foam, it cannot play any of these roles which are essential to the favorable functioning of fire break glazing.

In order to increase the fire behavior of glazing units, one measure currently used is to increase the number of glass sheets and intumescent interlayers. The principle is to successively oppose factors which accordingly slow down the final destruction of the glazing. In the case of an assembly comprising several layers of intumescent phosphate-based material, the difficulty may come from inadequate creep resistance at the temperatures preceding expansion. In fact, if during the fire test the thermal shock enables the first intumescent layer to expand properly, the temperature of the following layers "protected" by this first thermal barrier increases more slowly. If the intumescent material is not sufficiently resistant to creep at high temperature, the subsequent layers are not able to contribute satisfactorily.

Therefore, the inventors have sought to find improved intumescent materials which have a very high foam transformation temperature and at the same time are creep resistant at the intermediate temperatures preceding formation of the foam.

SUMMARY OF THE INVENTION

The inventors have shown that intumescent materials intended to form part of the composition of fire break glazing based on phosphates and comprising appropriate additives could meet this objective. The materials according to the invention contain as additive a very fine powder of pyrogenous silica or a mixture of pyrogenous silica and aluminum oxide.

The inventors have shown interest especially in incorporating these pyrogenous silicas possibly mixed with aluminum oxide to modify the properties of the intumescent materials formed from hydrated hydrogen phosphates of magnesium, calcium or aluminum, such as those described in the above-cited publication.

Powders of pyrogenous silica or a mixture of pyrogenous silica and aluminum oxide are commercially available in particular as fluidizing agent for powders, as filler in plastic materials or to serve as thickening agents in various products such as paints, cosmetic products etc.

The use of thickening agents in intumescent materials to modify their rheological properties has already been proposed. To maintain the transparent character of glazing it would therefore appear necessary to choose products which are not only compatible with the other constituents of the material, but also are soluble in this material.

The choice of suitable products is all the more sensitive since phosphate-based materials are very aggressive. Alkaline phosphates result in compositions with very acid pH values which are incompatible with the most usual thickening agents. Thickening agents previously proposed for these intumescent layers were, for example, hydroxyethyl celluloses, polyvinyl alcohols, natural rubbers etc. These have otherwise proved to be poorly suited to the effective conditions of use of the products under consideration. In particular, they do not further the formation of foam, which determines the essential properties of the glazing in its role as firebreak.

The inventors have shown that the incorporation of pyrogenous silica or a mixture of pyrogenous silica and aluminum oxide allowed modification of the rheological properties of the intumescent materials of fire break glazing with high thermal decomposition temperatures by using non-soluble thickening agents with good resistance to the pH conditions, and when used appropriately result in intumescent layers which also meet optical requirements: transparency, absence of air bubbles, crystals, and generally without any fault detrimental to the qualities of the final glazing.

Pyrogenous silicas are formed from particles of very small dimensions. Their average grain size lies between 7 and 40 nanometers, depending on type. The presence of hydroxyl groups on their surface provides them with a marked hydrophilic character. Pyrogenous silica particles are not changed in a highly acid medium. The introduction of this additive into the compositions according to the invention leads to the dispersion of particles into the intumescent material without dissolution in this.

The quantity of pyrogenous silica is advantageously in the range of between 1 and 10% by weight of the composition, preferably between 2 and 6%.

For various reasons, it is preferable to introduce the lowest possible effective quantity. The presence of particles in suspension generates a certain diffusion of light. Therefore it is desirable to limit the quantity of silica. However, to obtain the effect of a creep resistant gel, a minimum quantity of silica is clearly necessary. The most suitable proportions must be determined according to the case, taking into consideration many contributing factors, especially the quantity of water in the produced composition.

For the applications in question, the water content in the intumescent material is fixed to meet various, sometimes contradictory demands.

Firstly, the water content must properly assure the formation of foam when the glazing is exposed to fire. For this, a certain quantity of water is obviously required which will allow expansion of the material when it evaporates. To enable the foam to exhibit good resistance to convection and radiation, it is necessary that it is formed from a large quantity of uniformly distributed pores. Experience shows that to provide good expansion, the quantity of water must be precisely selected. It appears that for too large a quantity of water, the air bubbles, which initially appear in large number during expansion, become too large and cause disorderly coalescence. The result is a foam with pores of very irregular dimension, which exhibits a poorer thermal resistance. Secondly, the water content significantly influences the stability of the optical and mechanical properties of the intumescent layer. The lower the content, the greater the risk of crystals forming. A very low water content may also lead to ageing faults in the layer. Cracks and fissures can appear in the course of time. Conversely, a high water content prevents the formation of crystals, but, as we will see below, contributes to the increase in light diffused by the silica particles.

The water content also has an influence on the conditions in which the preparation of the intumescent layer is conducted. Once again, contradictory conditions must be met. The preparation of the material and its formation are facilitated by a high water content, which also results in a low viscosity. In particular, as the material is fluid, the glazing can be produced by the material flowing directly between the glass sheets, which enables economic formation of a sheet of intumescent material and of the subsequent assembly of this with glass sheets. However, if the initial fluidity has the advantages, which have just been indicated, the material must ultimately coagulate into a gel, which is more difficult to achieve when the initial water content is higher. If the water content of the material is too high, for example, because of the conditions determined by its preparation, then it becomes necessary to proceed to a more or less lengthy and delicate drying step to achieve the degrees of hydration and firmness of the desired gel. As far as possible, the aim is to prepare a composition of intumescent material which does not require drying or in which the drying step is as limited as possible. The examples will show more precisely how to direct the choices allowing these different demands to be met.

In general, the quantity of water contained in the intumescent material of the glazing is not less than 18%, and not more than 40% to meet the conditions of expansion leading to the formation of a homogeneous foam. To ensure that the intumescent layer practically does not show any diffusion of light (preferably less than 1%), without having recourse to any possible means allowing the correction of what appears as a fault and which will be discussed below, the water content is advantageously at most equal to about 35%, preferably 30%. Finally, to direct the composition into a state of fluidity, which allows it to flow easily between glass sheets, the water content is advantageously at least 30%. Consequently, it is difficult to meet all the conditions simultaneously without having recourse to other means, which are also the subject of the invention.

The introduction of pyrogenous silica according to the invention, as indicated above, is accompanied by a dispersion of particles, which leads to a certain diffusion of light. Even if this diffusion remains limited, it is preferable in order to improve the optical quality of the glazing to further reduce it, even to eliminate it completely. In all cases, to give satisfaction, the transparent glazing according to the invention must not have a total diffusion greater than 3%, and preferably this diffusion must be at most equal to 1%.

We have stated that a low water content would be preferable to restrict the diffusion. The inventors have further shown that it was possible to cause the diffusion to disappear by adjusting the water content. The reason for this is as follows. The introduced silica particles have a refractive index of slightly less than 1.5. The base compositions of the solution intended to form the intumescent layer, with water contents corresponding to the modes of preparation described in particular in the WO patent application referred to, normally have refractive indexes which are different from those of the particles. These compositions normally have a lower refractive index in the order of 1.4. The difference between the indexes is the cause of the diffusion. The inventors have shown that it was possible to modify the index of these compositions until that of the particles was reached by changing the water content. A reduction in the water content, as indicated in the examples, allows an increase in the index, if necessary until that of the particles is equaled.

In any case, it is possible according to the invention to reduce the diffusion without changing the water content by introducing additives into the composition, which allow the refractive index of the composition to the modified. The choice of these additives and their content in the composition, as above, aims at directing the solution to an index, which is as close as possible to that of the silica of the particles.

As a general rule, additives allowing the refractive index to be corrected are products, which may be mixed, in the base solution and their own index is different from that of the solution. Naturally, the additives must not have a negative influence on the properties of the intumescent layer.

For very acid phosphate-based compositions, the additives correcting the index must be stable in this medium. They must have a higher index than that of the base composition, and preferably even higher than that of the pyrogenous silica. The following compounds are suitable candidates, for example; 4-acetyl-morpholine (n 1.483), sulphonal (n 1.484), furfuryl alcohol (n 1.4845), (2-aminoethylamino)2-ethanol (n 1.4861, ethyl pyridine-3-carboxylate (n 1.504), (piperazinyl-1-)-2-ethanol (n 1.5052), 3-phenyl propionic acid (n 1.5106), 2-phenyl butyric acid (n 1.515), N-methylbenzylamine (n 1.5235), 1-phenylethanol (n 1.5265), (pyridyl-2)-2-ethanol (n 1.5368), benzylic acid (n 1.5396), allyl-2-phenol (n 1.544), 2-chlorophenol (n 1.5579), 2-anilinoethanol (n 1.5593), 2-chlorophenol (n 1.5793). The preferred additives are glycerol and dimethyl sulphoxide (DMSO). These compounds can represent up to 15% by weight of the total material of the intumescent layer, but preferably amount to less than 10%.

The base materials forming the intumescent layer are phosphates of magnesium, calcium or aluminum, with a P/Mg (or Ca or Al) ratio higher than 2. The material is no longer sufficiently transparent at values for this ratio below the indicated limit. It takes on a milky appearance which is not normally wanted for glazing, and which results from the precipitation of insoluble phosphates when the medium is not sufficiently acid.

In the final product the intumescent layer must retain its properties, in particular transparency, for so long as the glazing is not subjected to the fire test. It is also necessary that in usual ambient conditions the intumescent gel does not develop disruptive crystallization, or does not enable the formation of air bubbles or cracks in sufficient quantity to modify its appearance in a totally unacceptable manner. In particular, depending on the water content of the gel, it may be advantageous to add a salt or hydroxide of aluminum to the composition. The presence of these compounds, especially the salts $AlCl_3$ or $AlNO_3$, prevents or substantially slows down the formation of crystals in the intumescent layer incorporated into the glazing. The preferred proportions for this additional compound of aluminum are advantageously such that the atomic ratio Al/Mg is in the range of between 0.05 and 0.4.

The preparation of the intumescent layer forming part of the composition of the glazing according to the invention is outlined in detail in the following description relating to practical examples.

DETAILED DESCRIPTION

The test solutions are formed from hydrated magnesium dihydrogen phosphate. The solution is supplemented by a constituent of aluminum, depending on the case. In order to form the base solution, an 85% aqueous solution of phosphoric acid is used. Magnesium tetrahydroxycarbonate ($4MgCO_3.Mg(OH)_2.4H_2O$) is added.

The molar ratio P/Mg is always higher than 2. With lower values the solution causes the formation of poorly soluble $MgHPO_4.3H_2O$ which precipitates. A typical base solution is formed with a P/Mg ratio of 2.24. Based on the compounds indicated, the prepared solution contains 57% water. Its pH is about 1.6 to 1.7.

The magnesium hydroxycarbonate is dissolved by intense agitation. Dissolution is slow. It is assisted to a limited degree by an increase in temperature. Once dissolution has been completed, the solution is filtered to eliminate any undissolved particles or crystals remaining which as such would constitute faults in the final layer.

To attain the various concentrations of water forming the subject of these tests, the base composition, initially formed as a gel, is dried in a ventilated drying oven. As already known, the drying can be performed in a microwave heating chamber. When performing these tests in the case of the compositions according to the invention including silica, the formation of the gel precedes the drying which modifies the concentration of water. This procedure prevents any irregularity from forming in the structure of the final gel, i.e. such irregularities as folds, grains or cracks, faults that are observed when in the rest of the operations drying precedes gelling.

The problems of conducting drying operations are well known. It is a matter of evacuating part of the water from the intumescent layer being formed, while retaining perfect homogeneity in the product. In particular, the formation of air bubbles or crystals must be prevented during this treatment, and progressive drying in a ventilated oven is preferred for this. Starting from a gel, drying is necessarily slow, in particular so as to avoid the formation of a "skin" on the surface in contact with the atmosphere of the drying oven. This very restrictive drying operation is reduced as far as possible, and even omitted in the industrial production of the products according to the invention. However, this type of drying has been used for the requirements of these tests in order to respond to the necessity of determining the behavior of products studied in various conditions.

Without adding pyrogenous silica, the drying necessary for forming a suitable intumescent layer can be considerable. Without silica, experience has shown that a water content lying between 20 and 30% by weight of the layer is required to obtain a layer, which forms an adequate foam. The difficulty with these values, apart from the length of treatment, is to arrive at a favorably homogeneous intumescent layer, which retains the desired optical quality. The addition of pyrogenous silica enables products containing substantially higher contents of water to be worked with, and thus to at least partially eliminate these difficulties.

The addition of silica is conducted on the solution of phosphates, which has been prepared and filtered as indicated above. Incorporation of the silica powder into the solution requires vigorous agitation, since the particles tend to form more or less voluminous accumulations. The perfectly uniform dispersion of particles is all the more difficult when the solution has a lower water content and is therefore more viscous. An excess amount of silica in relation to the useful quantity is therefore not only superfluous but may also complicate the process of obtaining a homogeneous composition.

The silica used for the tests is that marketed by Degussa under the name "Aerosil 200". This is a powder having particles with an average grain size of 12 nanometers.

The quantity of powder introduced into the solution to obtain a gel depends on the water content. The nature of the powder and the manner in which it influences the modification of the solution mean that beyond a certain relatively low quantity, the addition of silica adds nothing to the rheological characteristics of the composition. In the tests, the added silica represented 3, 4 or 5% by weight of the intumescent material.

The quantity of silica necessary to produce a suitable gel increases on first approximation with the water content of the intumescent material. Thus, it is possible to obtain a gel in 24 hours working from a solution of 57% water by adding 5% by weight of silica. With lower proportions of silica, e.g. 4%, and working from the same solution, no gel is obtained even after a resting period of 7 days. With a solution with 37.5% water, an addition of 4% silica is sufficient to form a gel in less than 24 hours.

The above statements show that gel formation is not instantaneous, this being dependent on the nature of the constituents and on the way they react with each other. The bonds configure slowly within the composition until the structural balance corresponding to the gel is reached.

The prepared compositions are introduced into test cells reproducing glazing conditions. The cells are formed from two 200×200 mm glass sheets, between which the intumescent layer is located.

The gels forming the intumescent layer containing different proportions of water are firstly tested for their creep resistance at temperatures of 50 and 80° C. With the cells placed in a vertical position, the behavior of the 2 mm thick intumescent layer at the indicated temperatures is observed. Tests were conducted with compositions containing 35, 38.5 and 42% water and 4 and 5% silica. No creep was observed at the indicated temperatures after 24 hours. By comparison, a gel of the same composition but without silica cannot be maintained in these conditions in the cell. Creep is evident in the intumescent layer without silica even in a material with a water content less than that of the products according to the invention concerned in this test.

Therefore, the materials according to the invention subjected to the fire test cycle are not degraded at the start of the cycle. They remain in position and are able to expand properly to form an insulating foam. Continuation of the cycle showed that the foam formed by expansion is resistant up to temperatures higher than 700° C. Decomposition of the foam occurs between 700 and 900° C. Fusion of the material results at about 1100° C.

The addition of pyrogenous silica, in other words of solid particles, to the solution of phosphates with 57% water prepared as indicated above, causes a certain light diffusion forming a bluish halo. If the water content is reduced, the refractive index of the composition of the intumescent material increases. To eliminate this halo, the water content must be brought to a level where the refractive index approaches that of the silica particles. The refractive index in the case of Aerosil 200 is 1.46. Measurements of the index in relation to the water content show that the composition reaches this index with a water content in the order of 30%. With this value the composition of the material has a homogeneous refractive index. There is no further light diffusion.

It goes without saying that the water content allowing adjustment of the indexes of the solution and of the silica is dependent on the precise composition of the solution. Even if the variations in index are relatively insignificant with respect to the composition, they lead to quite different water contents for "equalizing the indexes". The addition of aluminum chloride, for example, increases the index of the composition and enables the index of the silica to be reached with a higher water content, all other factors being equal. Conversely, an increase in the P/Mg ratio tends to reduce the index of the solution. As an indication, with a P/Mg ratio equal to 3. (the ratio of the reference solution being 2.24), the index for 30% water is about 1.44. It would have to be possible to prepare a composition containing less than 20% water to reach the index of the silica. This solution is not preferred either from the point of view of being able to prepare this composition by drying or with respect to the qualities of the resulting layer to form insulating foam.

In the last situation, it is possible to adjust the index of the composition by means of additives such as glycerol or DMSO so as to achieve an index close to that of the silica. When maintained in proportions not greater than 20%, these compounds and in particular glycerol do not appreciably modify the qualities of the intumescent material. It is desirable to limit the content to the indicated value. With higher contents, carbonization of these organic compounds during the fire test could increase thermal conduction of the foam formed and thus reduce the resistance of the glazing.

As an indication, the refractive index of a solution of phosphates (P/Mg 2.24 and Al/Mg 0.3) containing 4% silica and 37% water will be seen to go from 1.44 to almost 1.45 as a result of adding glycerol. The same composition with 40% water goes from 1.435 to 1.443 as a result of adding 10% DMSO.

The increase in the index has a direct influence on the optical quality of the intumescent layer. Even if the indexes of silica and the solution are not identical, the closeness allows the measured diffusion to be appreciably reduced. In the case of the examples of compositions indicated above, the layer without glycerol has a diffusion of 1.18%. The same layer containing glycerol only has a diffusion of 0.87%. Therefore, by combining the actions of the water content and the additives, it is possible to correct the effect of diffusion resulting from the presence of silica until acceptable values are achieved.

The compositions prepared according to the above indications have also been subjected to ageing analyses. The materials must retain properties, in particular those of transparency and of absence of optical faults over very long periods of use. The most significant factor in this respect is the risk of crystals being formed in the transparent material.

The inventors have been able to verify that the presence of aluminum chloride or nitrate in the composition enables the formation of crystals to be prevented or considerably reduced. The addition of the aluminum compound is preferably performed before the introduction of silica and after filtration of the solution of phosphates.

The products prepared in these tests contain a quantity of aluminum ion such that the atomic ratio Al/Mg is 0.1, 0.2 and 0.3 respectively. The layers have a composition comprising 43% water and 5% silica. The P/Mg ratio remains 2.24. The test samples are observed for 24 hours and 7 days after preparation. The product with a low aluminum content (Al/Mg 0.1) exhibits a significant number of crystals from the first day. After a week, the same product has been colonized by crystals. The second sample (Al/Mg 0.2) only exhibits a small number of crystals at one day and a more significant number after a week. Finally, the last sample (Al/Mg 0.3) does not contain any fault after 24 hours and a completely acceptable number of discernible crystals after a long ageing period. The presence of the aluminum compound therefore enables the appearance of undesirable crystallization faults to be favorably controlled.

As indicated above, the compositions of intumescent materials according to the invention have the further advantage, if necessary, of facilitating the production of glazing units by allowing the composition to be introduced directly between the glass sheets of the glazing. By appropriate selection of the constituents of this composition and the proportions thereof, it is possible to prepare a solution having rheological characteristics which, on the one hand, allow introduction of the composition in a sufficiently fluid form for it to flow freely and occupy the space between the glass sheets and, on the other hand, result in a properly stable gel with all the required thermal and optical characteristics within a few hours.

In the case of the compositions indicated above (P/Mg 2.24), the lowest water content which allows this flow between the sheets is about 35%. Compositions, which have at least this water content and which can be gelled by the addition of silica can result in the formation of glazing units without any drying treatment. The products according to the invention, on the one hand, exhibit the advantage of a better thermal resistance and, on the other hand, with respect to some of them at least, they can be produced in the simplest conditions to be applied.

The glazing units according to the invention can be produced with all types of glass sheets used for these applications. These may be the most usual soda-lime glass sheets. Sheets of borosilicates or even glass ceramic sheets may also be included, wherein the qualities of low thermal expansion constitute a frequently sought advantage. The glass is most frequently white, but may also be solidly colored. The thermal behavior of the glasses may be further improved by using thin layers having reflective properties in particular. In the same glazing layers of silicate gel can alternate with layers of phosphate gels.

Use of the glazing units according to the invention permits all the standard types of assemblies. They may be used in single or multiple glazing units, in mobile assemblies (doors, windows) or in fixed assemblies (wall elements, facades etc.), and generally in all traditional applications of fire break glazing units.

What is claimed is:

1. Transparent fireproof glazing comprising at least two glass sheets and an intumescent layer of material being located between the glass sheets, the layer containing primarily a phosphate-based compound as the intumescent material and the layer containing a substance from the group consisting of pyrogenous silica and a mixture of pyrogenous silica and alumina.

2. Glazing according to claim 1, wherein the phosphate-based compound is a hydrogen phosphate of X, where X is selected from the group consisting of Mg, Ca and Al.

3. Glazing according to claim 2, wherein the phosphate-based compound has an atomic ratio P/X grater than 2.0.

4. Glazing according to claim 1, wherein the intumescent layer further includes at least one of:
   (a) a salt of aluminum, or
   (b) a hydroxide of aluminum.

5. Glazing according to claim 4, wherein the phosphate-based compound is a hydrogen phosphate of Mg, and the atomic ratio of Al/Mg is in the range of between 0.1 to 0.4.

6. Glazing according to claim 1, and further including at least one of the following features (a) through (c):
   (a) the silica in the intumescent layer is composed of particles having an average grain size in the range of between 7 and 40 nanometers;
   (b) the quantity of silica in the intumescent layer is between 1 and 10% by weight of the intumescent layer;
   (c) the intumescent layer includes water in the amount of between 18 to 40% by weight of such layer.

7. Glazing according to claim 6, and including at least two of the features (a) through (c).

8. Glazing according to claim 6, and including all of the features (a) through (c).

9. Glazing according to claim 1, wherein the quantity of silica in the intumescent layer is between 2 and 6% by weight.

10. Glazing according to claim 1, wherein the intumescent layer includes water in the amount of between 30 to 35% by weight of such layer.

11. Glazing according to claim 1, wherein the intumescent layer includes water in an amount which is adjusted so that the refractive index of the intumescent layer approximates the refractive index of the silica contained therein.

12. Glazing according to claim 1, wherein the intumescent layer includes an additive so that the refractive index of the intumescent layer approximates the refractive index of the silica contained therein.

13. Glazing according to claim 12, wherein the additive is an amount not exceeding 15% by weight of the intumescent layer.

14. Glazing according to claim 12, wherein the additive is selected from the group consisting of glycerol, DMSO and ethylene glycol.

15. Glazing according to claim 12, wherein the additive has a higher index of refraction that the index of refraction of the phosphate-based compound.

16. Glazing according to claim 1, wherein the intumescent layer includes a water content and a silica context such that the intumescent layer is sufficiently fluid to flow between the glass sheets and further forms a gel therebetween in approximately 24 hours.

17. A method of forming a fireproof glazing including at least two glass sheets with an intumescent layer therebetween, the intumescent layer having sufficient fluidity to flow between the glass sheets and to thereafter form a gel therebetween, comprising the steps of:
   (a) providing for the intumescent layer primarily a phosphate-based solution having a first index of refraction;
   (b) mixing a pyrogenous silica having a second index of refraction with said phosphate-based solution; and
   (c) adjusting as necessary the first index of refraction to approximate the second index of refraction such that the intumescent layer flows between the glass sheets and thereafter forms a gel as aforesaid.

18. The method according to claim 17, wherein step (c) is at least on of the following:
   (d) adjusting the amount of water in the phosphate-based solution;
   (e) providing an additive to change the first index of refraction.

19. The method according to claim 18, and including both steps (d) and (e).

20. The method according to claim 17, wherein the amount of said pyrogenous silica is between about 1 and 10% by weight of the intumescent layer.

21. The method according to claim 17, wherein the phosphate-based solution has an atomic ratio P/X greater than 2, and where X is selected from the group consisting of Mg, Ca and Al.

22. The method according to claim 17, wherein the intumescent layer further includes a crystal formation retardant which at least retards, if not prevents, the formation of silica crystals.

23. The method according to claim 12, wherein the phosphate-based solution includes phosphate of magnesium and the crystal formation retardant includes aluminum present in an atomic ratio Al/Mg in the range of between 0.05 to 0.4.

24. The method according to claim 18, wherein the additive is present in an amount not exceeding 20% by weight of the intumescent layer.

25. The method according to claim 24, wherein the additive is selected from the group consisting of glycerol, DMSO and ethylene glycol.

26. The method according to claim 17, wherein the silica in the intumescent layer is composed of particles having an average grain size in the range of between 7 and 40 nanometers.

27. The method according to claim 26, wherein the amount of said pyrogenous silica is between about 1 and 10% by weight of the intumescent layer.

* * * * *